(12) United States Patent
Hammer et al.

(10) Patent No.: US 10,180,349 B2
(45) Date of Patent: Jan. 15, 2019

(54) METHOD AND GONIORADIOMETER FOR THE DIRECTION-DEPENDENT MEASUREMENT OF AT LEAST ONE LIGHTING OR RADIOMETRIC CHARACTERISTIC VARIABLE OF AN OPTICAL RADIATION SOURCE

(71) Applicant: LMT Lichtmesstechnik GmbH Berlin, Berlin (DE)

(72) Inventors: Raymund Hammer, Berlin (DE); Carsten Diem, Berlin (DE); Horst-Guenther Ulrich, Berlin (DE); Thomas Reiners, Berlin (DE)

(73) Assignee: LMT Lichtmesstechnik GmbH Berlin, Berlin (DE)

( * ) Notice: Subject to any disclaimer, the term of this patent is extended or adjusted under 35 U.S.C. 154(b) by 0 days.

(21) Appl. No.: 15/544,758

(22) PCT Filed: Jan. 8, 2016

(86) PCT No.: PCT/EP2016/050267
§ 371 (c)(1),
(2) Date: Jul. 19, 2017

(87) PCT Pub. No.: WO2016/116300
PCT Pub. Date: Jul. 28, 2016

(65) Prior Publication Data
US 2018/0003553 A1    Jan. 4, 2018

(30) Foreign Application Priority Data

Jan. 22, 2015  (DE) .................... 10 2015 201 093

(51) Int. Cl.
*G01J 1/02* (2006.01)
*G01M 11/06* (2006.01)
(Continued)

(52) U.S. Cl.
CPC .......... *G01J 1/0242* (2013.01); *G01J 1/0407* (2013.01); *G01J 1/44* (2013.01); *G01M 11/064* (2013.01);
(Continued)

(58) Field of Classification Search
CPC .. A61K 2300/00; A61K 31/14; A61K 31/164; A61K 31/695; A61K 31/7048;
(Continued)

(56) References Cited

U.S. PATENT DOCUMENTS

| | | |
|---|---|---|
| 5,504,574 A | 4/1996 | Murata |
| 5,729,336 A | 3/1998 | Prettyjohns et al. |

(Continued)

FOREIGN PATENT DOCUMENTS

JP    2005-300477 A    10/2005

OTHER PUBLICATIONS

Norm DIN 5032-1; Apr. 1999; 14pp.
(Continued)

*Primary Examiner* — Tri T Ton
(74) *Attorney, Agent, or Firm* — Lewis Roca Rothgerber Christie LLP

(57) ABSTRACT

The invention relates to a gonioradiometer for the direction-dependent measurement of at least one lighting or radiometric characteristic variable of an optical radiation source (2), having: an apparatus for moving a radiation source (2) during a measurement operation about a first axis (31) and about a second axis (32) that is perpendicular to the first axis (31); a measuring wall (5) exhibiting homogeneous reflection, on which the light from the radiation source (2) is reflected; and a locationally fixed and immovably arranged camera (7) having an optical unit (8) and a two-dimensional sensor chip (100). The camera (7) is arranged such that it captures light reflected on the measuring wall (5), wherein
(Continued)

the reflected light is imaged by the optical unit (8) of the camera (8) onto the sensor chip (100) of the camera (7), and wherein the sensor chip (100) records measurement values as the radiation source (2) is rotated during a measurement operation, which measurement values indicate the lighting or radiometric characteristic variable substantially on a spherical surface about the radiation centroid of the radiation source (2). The invention furthermore relates to a method and a gonioradiometer for the direction-dependent measurement of at least one lighting or radiometric characteristic variable of an optical radiation source (2), in which provision is made for at least two fixedly installed sensors (1, 100) to be used which provide measurement values simultaneously during a measurement.

21 Claims, 11 Drawing Sheets

(51) Int. Cl.
G01J 1/04 (2006.01)
G01J 1/44 (2006.01)
G01J 1/42 (2006.01)
(52) U.S. Cl.
CPC . G01J 2001/4247 (2013.01); G01J 2001/448 (2013.01)

(58) Field of Classification Search
CPC ........ A61K 33/30; A61K 36/28; A61K 36/48; A61K 36/81; A61K 36/886; A61K 38/56; A61K 31/4174; A61K 45/06; A61K 9/0014; A61K 9/06
USPC .................................................. 356/123–127
See application file for complete search history.

(56) References Cited

U.S. PATENT DOCUMENTS

| 7,800,745 | B2 | 9/2010 | Pan |
| 8,520,198 | B2 | 8/2013 | Kuo |
| 2009/0185173 | A1 | 7/2009 | Ashdown et al. |
| 2012/0194820 | A1 | 8/2012 | Kuo |
| 2013/0265570 | A1 | 10/2013 | Enami |
| 2014/0055779 | A1 | 2/2014 | Enami |

OTHER PUBLICATIONS

CIE No. 70 (1987): "The measurement of absolute luminous intensity distributions", Central Bureau of the CIE, ISBN 3 900 734 05 4, 54pp.
Lewin, Ian et al.; "Advances in Measurement Technology for Vehicle Lighting Systems"; SAE Technical Paper, Paper 960919; Jan. 2, 1996; pp. 107-114.
Examination Report for German Patent Application No. 10 2015 201 093.7 dated Dec. 9, 2015, 7pp.

METHOD AND GONIORADIOMETER FOR THE DIRECTION-DEPENDENT MEASUREMENT OF AT LEAST ONE LIGHTING OR RADIOMETRIC CHARACTERISTIC VARIABLE OF AN OPTICAL RADIATION SOURCE

CROSS-REFERENCE TO RELATED APPLICATION(S)

This application is a National Phase Patent Application of International Patent Application Number PCT/EP2016/050267, filed on Jan. 8, 2016, which claims priority of German Patent Application 10 2015 201 093.7, filed Jan. 22, 2015. The entire contents of both of which are incorporated herein by reference.

The invention relates to a method and a gonioradiometer for the direction-dependent measurement of at least one lighting or radiometric characteristic variable of an optical radiation source.

For the measurement of lighting or radiometric characteristic variables of lamps and luminaires, gonioradiometers are usually used. These are mechanical optical measurement systems with which the direction dependence of variables is determinable for describing optical radiation. By way of example, depending on the sensor or measurement device head used, the light intensity distribution or the color distribution body of a light source can be determined. The light or radiation source is arranged with its light centroid in the center of the gonioradiometer and thus in the coordinate origin of a spherical coordinate system. Measurement values of a lighting or radiometric characteristic variable can in this case be measured goniometrically, i.e., for all directions, by rotating the light or radiation source or by moving the sensor successively in different angle regions.

The lighting or radiometric characteristic variables for the source are obtained by evaluating individual directions and/or by way of the integration of the measurement results over subregions or the entire solid angle of a distribution body.

A lighting or radiometric characteristic variable, such as the light intensity, is a direction-dependent variable, the emission direction of which can generally be given by two angles in a coordinate system connected to the light source. In practice, description by way of specific plane systems has become popular, which are described as A planes, B planes and C planes. These planes are defined in the standard DIN 5032 Part 1 (1999). A corresponding definition can also be found in the document CIE No. 70 (1987): "The measurement of absolute luminous intensity distributions," Central Bureau of the CIE, ISBN 3 900 734 05 4.

In practice, specific gonioradiometer types have proven useful, which are likewise defined in DIN 5032 Part 1 and in the document CIE No. 70 (1987). Of interest in particular are gonioradiometers of the type 1.1 to 1.3, in which the light source is rotated during measurement, while the sensor is locationally stable. The light source or radiation source is here attached with its light centroid or radiation centroid in the center of the gonioradiometer. Depending on the type of gonioradiometer, A, B or C planes are measured. Lighting test centers or laboratories must keep available different gonioradiometers in order to be able to execute all measurement tasks.

There is a need in a goniometer to capture as quickly as possible the solid angles to be captured in order to keep the measurement time short and thus the costs per measurement as low as possible.

Consequently, the present invention is based on the object of providing a method and a gonioradiometer for the direction-dependent measurement of at least one lighting or radiometric characteristic variable of an optical radiation source, which allow a short measurement time.

This object is achieved according to the invention by way of a gonioradiometer having the features of claim 1, by way of a method having the features of claim 8. Configurations of the invention can be found in the dependent claims.

According to the invention, at least two sensors are thus provided, which simultaneously provide measurement values during a measurement.

In a first invention aspect, the present invention accordingly relates to a method in which the measurement of the intensity distribution is effected by simultaneously reading out a plurality of suitably attached sensors. By using a plurality of sensors, the measurement time can be considerably shortened. The solution according to the invention of using a plurality of sensors here relates to gonioradiometers of type 1, in which the light source is moved, while the sensors are arranged in a locationally fixed manner.

The invention, in all its invention aspects and configurations, here preferably performs measurements using a plane system, in which the planes of a plane system intersect in an intersection line, which extends through the radiation centroid of the radiation source. A specific plane of a plane system is identified by a first angle. Defined within such a plane is a second angle, the emission angle, which indicates the emission direction of the radiation within a considered plane. A specific point in this space is thus defined firstly by way of a first angle that identifies the plane and by way of a second angle that indicates the emission direction within the considered plane. The three standardized A, B and C plane systems differ in terms of their arrangement with respect to the light source and in terms of their definition of two reference axes, as is described in detail in DIN 5032 Part 1, wherein reference is additionally made to this description.

Where the word "sensor" is used within the context of the present invention, all embodiments of sensors which are suitable for measuring optical radiation (ultraviolet, visible light and infrared) in particular in the wavelength range of 100 nm (UV-C) to 1 mm (IR-C) or in a subregion of this wavelength range are meant. The sensors can be, for example, spectral radiometers, photometers, photomultipliers, or infrared, ultraviolet or color measuring heads. As will be explained below, the sensors within the meaning of the present invention can also be the photosensitive pixels of a CCD sensor or of a CMOS sensor.

According to one configuration of the invention, the at least two sensors are aligned along the first axis and/or along the second axis, wherein the first axis and the second axis are the axes about which the optical radiation source is pivoted during a measurement operation.

Provision can in particular be made for the at least two sensors to extend parallel to an axis (and thus on a longitude or latitude) about which the optical radiation source is pivoted during a scan. A first example thereof is an arrangement in which the at least two sensors are arranged vertically one above the other, with the optical radiation source being pivoted along a horizontal direction. In each scan operation, a plurality of "latitudes" are thus captured simultaneously owing to the multiplicity of sensors. A second exemplary embodiment in this respect makes provision for the at least two sensors to be arranged horizontally next to one another, with the optical radiation source being panned along a vertical direction. For this case, a plurality of "longitudes" are recorded at the same time owing to the plurality of sensors during each scan. In both cases it is advantageous if the multiple sensors are arranged at equal distances from the object to be measured, i.e., the optical radiation source, which is located in the origin of the coordinate system, or are arranged with fixed solid-angl distance with respect to one another.

A further configuration of the invention makes provision for the at least two sensors to be arranged in a linear sensor array with a constant distance with respect to one another along an axis. The arrangement of the sensors is here pivotable as a whole about an axis that extends perpendicularly to said axis on which the sensors are arranged linearly. It is possible hereby, by pivoting the linear sensor array about the pivot axis, to set arbitrary vertical or horizontal angle distances of the sensors. The respective vertical and horizontal offset is to be removed by calculation in the evaluation.

Provision can be made in said exemplary embodiments for the at least two sensors to be arranged on a longitude or latitude and thus to be aligned with the optical radiation source. As a consequence, perpendicular incidence of the light on the sensor surface is ensured. In addition, the arrangement on a great circle with a fixed radius ensures simple algorithms in the adjustment in the mathematics of the later evaluation.

A further configuration of the invention makes provision for the at least two sensors to be arranged in the form of a two-dimensional array or a matrix. The sensors are thus in an n x m grid, with n, m≥2. The distance between the individual sensors in the matrix can be constant. In one configuration, the sensors are arranged on a spherical surface and have constant angle distances. To simplify the mechanical construction, the sensors can alternatively also be mounted on any other desired surfaces such as e.g., a plane, as long as constant solid-angle distances with respect to the object to be measured, which is arranged in the origin of the coordinate system, are realized. When using a two-dimensional array, horizontal and/or perpendicular scans can be performed with a path length which is considerably shorter as compared to that of the individual sensor.

According to a further configuration of the invention, the light from the radiation source is reflected on a measuring wall with homogeneous reflection. The reflected light is captured by a camera. The reflected light is here imaged by a camera optical unit onto a CCD sensor or a CMOS sensor of the camera. The individual pixels or photodiodes of the sensor here represent sensors within the meaning of the present invention.

This configuration of the invention thus provides for an indirect measurement of an irradiated measuring wall in reflection by way of a camera. The CCD sensor or CMOS sensor of the camera is here preferably photometrically corrected, i.e., weighted with the spectral brightness sensitivity of the standard human eye, although this does not necessarily have to be the case for all measurement tasks.

According to one variant of this configuration, an opening is additionally provided in the reflective measuring wall, through which the light from the radiation source additionally directly illuminates a further sensor, which is arranged fixedly in the hole or at a relatively great distance behind the hole. This makes it possible for outstanding points of the light distribution on the measuring wall to be measured for calibration purposes by way of the fixedly attached sensor (e.g., a photometer head) in the direct beam path. This variant also permits the use of the combination of measuring wall and camera only for the angle determination of outstanding points of a light distribution. This can have advantages for the traceability of the measurement values or when avoiding measurement uncertainties, because the measuring wall/camera combination does not need to be calibrated with complicated processes.

In one configuration of the invention, provision is made for light distributions, captured by the sensor chip after reflection on the measuring wall, of solid-angle regions, which belong to different positions of the goniometer, to be combined to form the light distribution which belongs to a greater solid-angle region. A suitable algorithm can be used herefor. The combining can be effected with an overlap of the individual images.

According to a further configuration of the present invention, provision is made for the light to pass between the radiation source and the at least two sensors through at least one imaging lens or at least one imaging lens system. One or more lenses can be provided here, which focus the light emitted from the radiation source or make it more convergent. This configuration can be used in all of the described variants. By using such a "shortening lens," the far field is shortened or brought closer. That means for example that the reflective measuring wall provided according to one of the exemplary embodiments no longer needs to be arranged in the actual far field. By using a lens between the radiation source and the at least two sensors, the measurement distance is shortened and the light distribution is decreased in size.

In a further invention aspect, the invention relates to a gonioradiometer for the direction-dependent measurement of at least one lighting or radiometric characteristic variable of an optical radiation source. The gonioradiometer has the following:
  at least one locationally fixed and immovably arranged sensor that is suitable for measuring the radiation from the radiation source, and
  a device for moving the radiation source about a first axis and about a second axis which is perpendicular to the first axis during a measurement operation such that the sensor records measurement values that indicate the lighting or radiometric characteristic variable substantially on a spherical surface about the radiation centroid of the radiation source.

According to the invention, at least two sensors are provided which are arranged such that both provide measurement values simultaneously during a measurement.

According to a further invention aspect, the invention relates to a gonioradiometer for the direction-dependent measurement of at least one lighting or radiometric characteristic variable of an optical radiation source, having the following features:
  an apparatus for moving a radiation source during a measurement operation about a first axis and about a second axis that is perpendicular to the first axis,
  a measuring wall exhibiting homogeneous reflection, on which the light from the radiation source is reflected, and
  a locationally fixed and immovably arranged camera having an optical unit and a sensor chip,
  wherein the camera is arranged such that it captures light reflected on the measuring wall, wherein the reflected light is imaged by the optical unit of the camera onto the sensor chip of the camera,
  and wherein the sensor chip records measurement values as the radiation source is moved during a measurement operation, which measurement values indicate the lighting or radiometric characteristic variable substantially on a spherical surface about the radiation centroid of the radiation source.

According to this configuration of the gonioradiometer, sensors of the gonioradiometer are provided by a sensor chip, which is in particular a CCD sensor or a CMOS sensor. Here, an arrangement is considered in which indirect measurement of the optical radiation source is effected using a camera with a sensor chip of this type over a uniformly reflecting wall.

According to a preferred variant of this configuration, the measuring wall is here in the far field of the light distribution of the radiation source, i.e., at a distance at which the measurement object can be considered approximately as a point light source. The arrangement in the far field can be effected in a variant such that a lens or a lens system is arranged between the radiation source and the measuring wall, which results in shortening of the measurement distance and decreasing the size of the light distribution on the measuring wall. According to this variant, the far field is brought closer to the radiation source, as it were, by way of the lens or the lens system and is imaged at a shorter distance on the measuring wall.

The invention will be explained in more detail below with reference to the figures of the drawing on the basis of a plurality of exemplary embodiments. In the figures.

Figure 7:
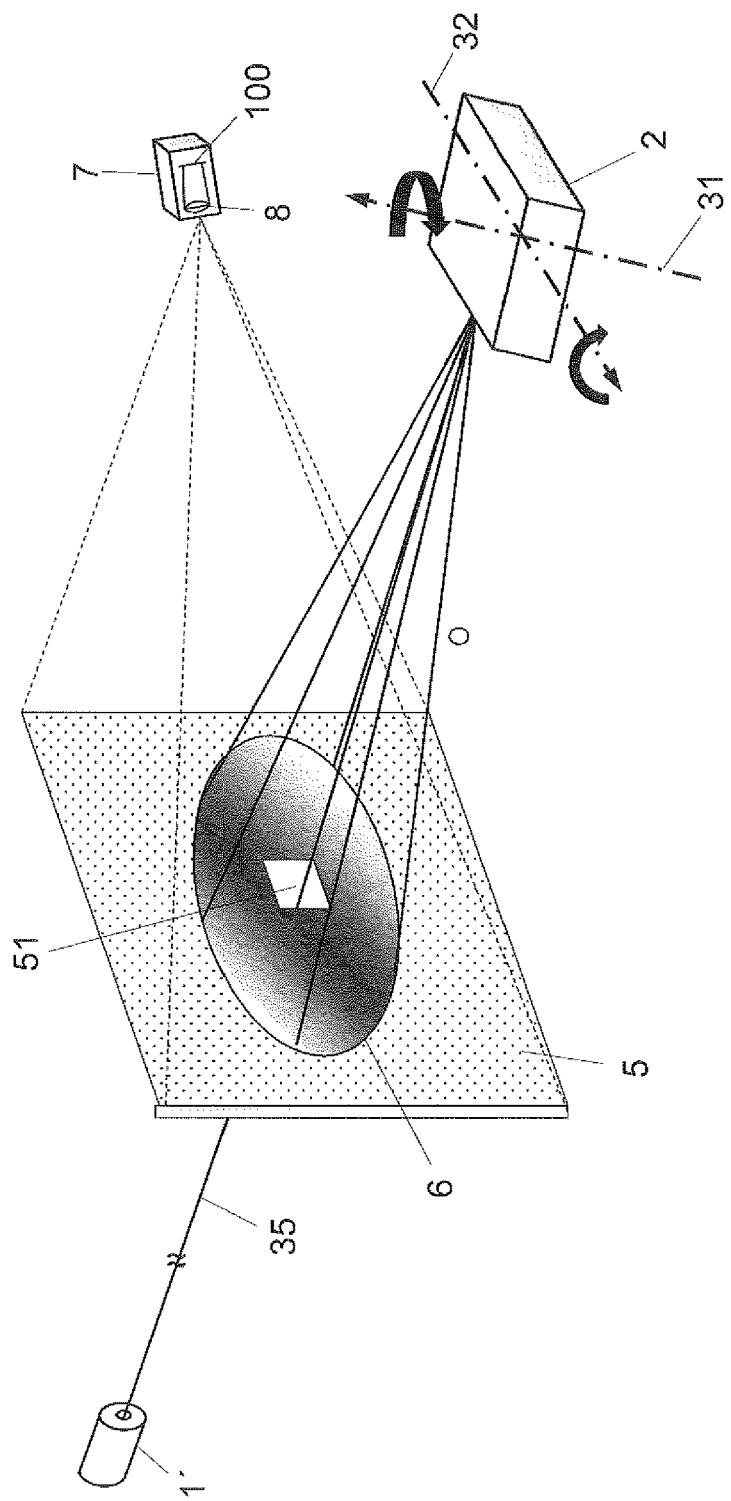
FIG. 7 shows a gonioradiometer comprising a reflective measuring wall and a camera having an integrated optical unit and a sensor chip.
Figure 8:
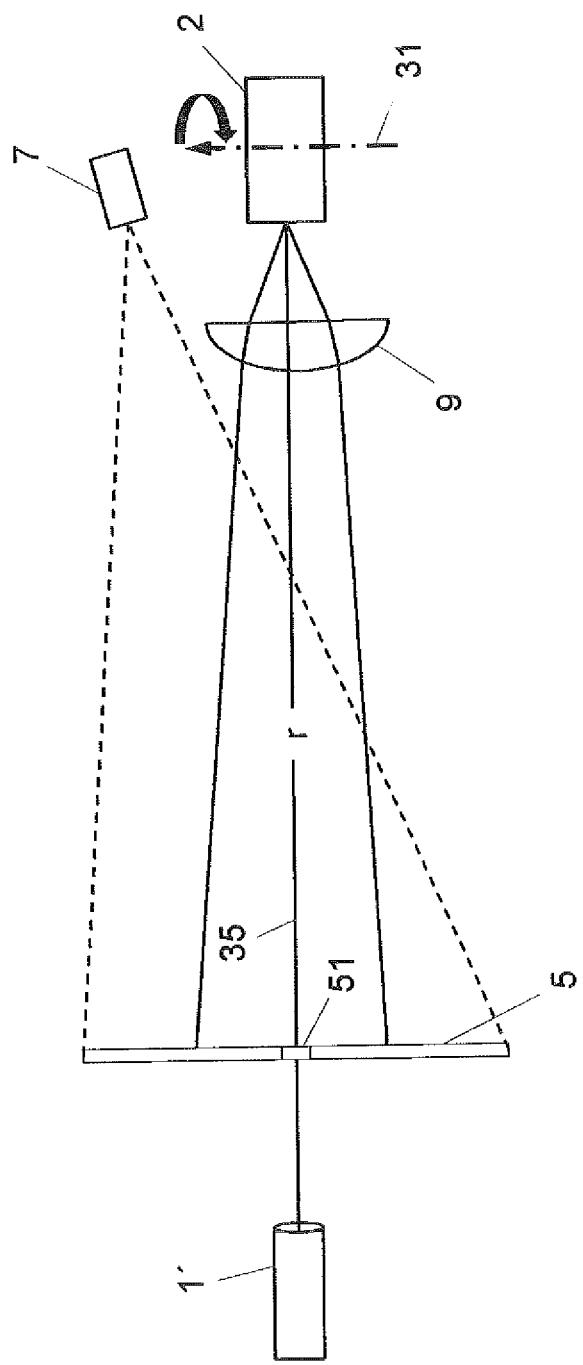
Figure 9:
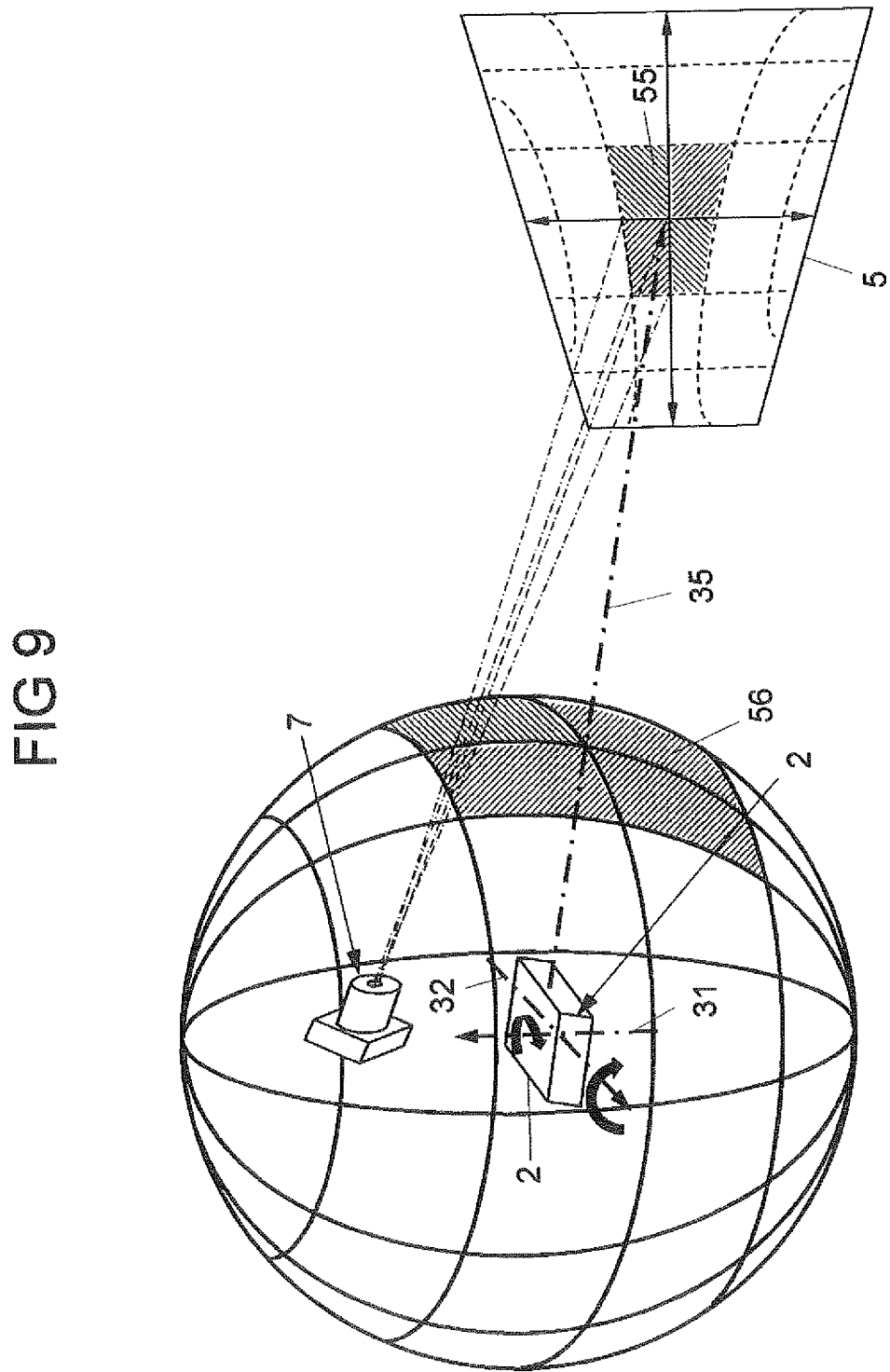
Figure 10:
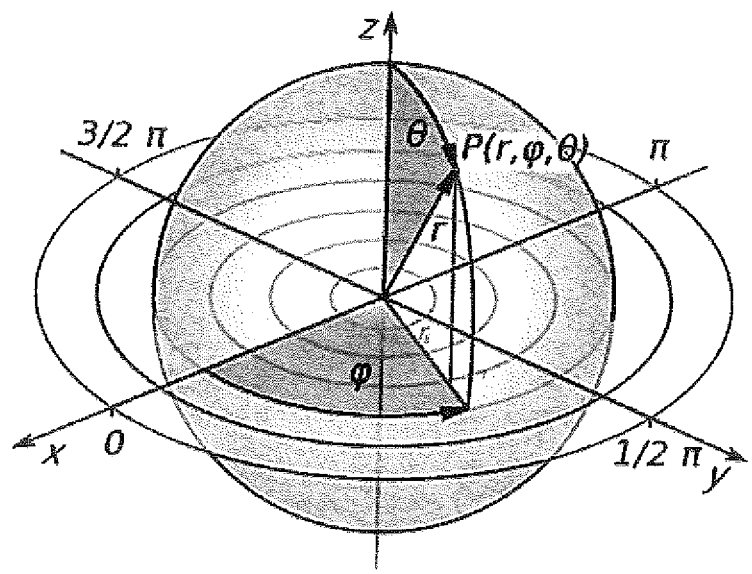
Figure 11:
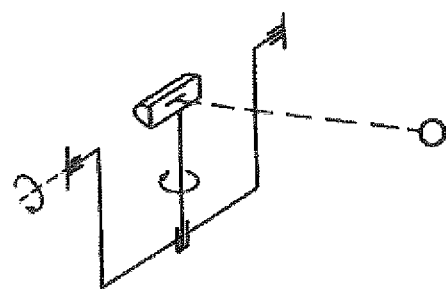
Figure 12:
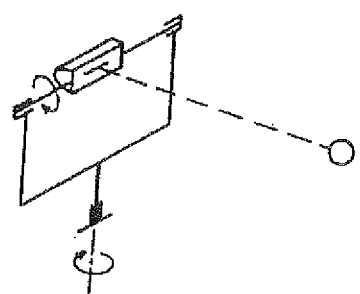
Figure 13:
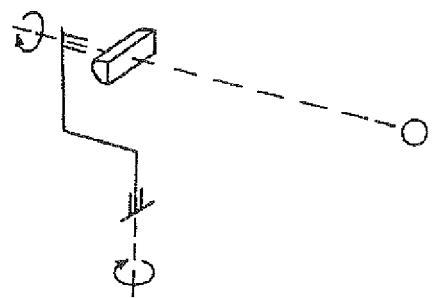

FIG. 8 schematically shows an arrangement according to FIG. 7, wherein additionally, a lens is provided for shortening the measurement distance and reducing the size of the light distribution on the measuring wall;

FIG. 9 schematically shows the combination of a plurality of wall parts to form spherical surfaces in a relatively large solid-angle element in a gonioradiometer according to FIG. 7 or 8;

FIG. 10 illustrates a spherical coordinate system, in the center of which an optical radiation source to be measured is located;

FIG. 11 schematically shows a gonioradiometer of type 1.1 having a spatially fixed horizontal axis and a spatially movable vertical axis for the measurement of A planes and B planes;

FIG. 12 schematically shows a gonioradiometer of type 1.2 having a spatially fixed vertical axis and a spatially moving horizontal axis for measuring A planes and B planes; and FIG. 13 schematically shows a gonioradiometer of type 1.3 having a spatially fixed vertical axis and a spatially movable horizontal axis, wherein the radiation source is perpendicular to the moving axis, for measuring C planes.

Before the invention is explained in more detail with reference to FIGS. 1 to 9 using an exemplary embodiment, the background of the invention will first be explained to provide a better understanding of the invention on the basis of FIGS. 10 to 13.

FIG. 10 represents a spherical coordinate system with illustration of the definition of the angles phi $\varphi$ and theta $\theta$. If a radiation source is located in the origin of such a spherical coordinate system, lighting or radiometric characteristic variables of the radiation source can be measured goniometrically, i.e., for all directions, by rotating the radiation source or by moving a sensor successively in the angle ranges $-180° \leq \varphi \leq 180°$ and $0 \leq \theta \leq 180°$. An emission direction can thus be defined by two angles $\varphi, \theta$.

It is customary to describe the light intensity distribution or another direction-dependent lighting or radiometric characteristic variable by using specific plane systems, which are referred to as A planes, B planes and C planes and are explained in the already mentioned DIN 5032 Part 1. Each plane system defines two axes, which intersect in the light centroid of the light source. A first axis is given by an intersection line, in which all planes of the plane system intersect. The second axis is given by the orientation of the lamp in the radiation source.

In A planes, the individual planes are identified with angles $A_x$ of $-180° X \leq 180°$. Within an A plane, directions or emission angles a are given by angle $\alpha$ of $-90° \leq \alpha \leq 90°$.

In B planes, the individual planes are identified with angles $B_x$ of $-180° X \leq 180°$. Within a B plane, directions are indicated by angle $\beta$ of $-90° \leq \beta \leq 90°$.

In C planes, the individual planes are identified with angles $C_x$ of $0° X 360°$. Within a C plane, directions are indicated by angle $\gamma$ of $0 \leq \gamma \leq 180°$.

Referring back to FIG. 10, it should be noted that, to the extent that the polar axis extends parallel to the z-axis, the angles $\varphi$ and $\theta$ describe a C plane system $C_x, \gamma$, wherein $\varphi = C_x$ and $\theta = \gamma$.

FIGS. 11 to 13 schematically show gonioradiometers of the type 1.1 to 1.3. In each case, a radiation source having a light-emitting region, a sensor (circular) and two axes are schematically illustrated, about which axes the radiation source can be pivoted. One of the axes is spatially fixed, i.e., if the radiation source is pivoted about this axis, its spatial alignment does not change. The other axis is not spatially fixed, since, in the case of panning about the fixed axis, the spatial alignment of the other axis necessarily changes.

In a goniometer of the type 1.1 according to FIG. 11, there are a horizontal axis that is fixed in its spatial position and an axis that is movable in its spatial position and, in the illustration of FIG. 11, extends vertically, but changes its spatial position when the arrangement is pivoted about the horizontal axis. A measurement of A planes or B planes is effected.

A gonioradiometer of type 1.1 used to measure A planes thus realizes a horizontal axis that is fixed in its spatial position. In the event that the arrangement is moved or scanned with the radiation source about the fixed, horizontal axis, A planes are recorded, wherein the emission angle a is varied. However, in the event that the moving, vertical axis moves with fixed a during a measurement operation, the parameter $A_x$ is varied, with the result that the fixed sensor runs on a spherical surface on "latitudes." The latter operating mode is typically used for characterizing motor vehicle headlights.

In a gonioradiometer of type 1.2 according to FIG. 12, there are a fixed vertical axis and a movable horizontal axis. A measurement likewise takes place in A planes or B planes. In a gonioradiometer of type 1.3 according to FIG. 13, there are a fixed vertical axis and a movable horizontal axis. Measurement is effected in C planes.

Proceeding from this explanation, a first exemplary embodiment of the present invention will now be described on the basis of FIG. 1. The invention is generally suitable for implementation with gonioradiometers of types 1.1, 1.2 and 1.3.

Figure 1:
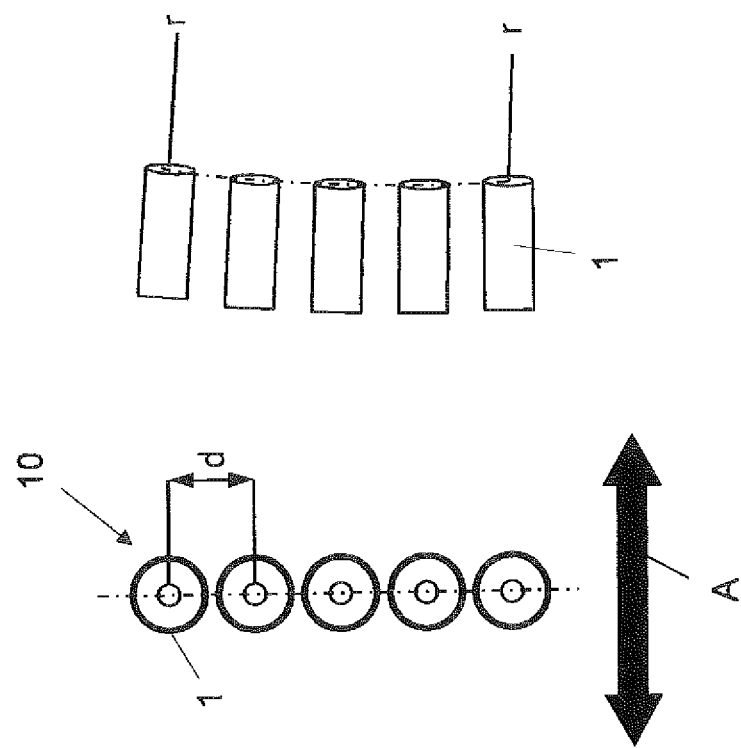
FIG. 1 shows a front and side view of vertically arranged sensors of a gonioradiometer.

FIG. 1 shows the vertical arrangement of sensors 1 in a linear array 10. The distance d between the individual sensors is here constant for all sensors 1. The sensors 1 have, as can be seen in the right-hand view of FIG. 1, the same distance r from an object to be measured, which is additionally illustrated in FIG. 2 and is located at the origin of a coordinate system according to FIG. 10. Provision may here be made for the sensors 1 of the vertically arranged linear array 10 to be arranged on a great circle and here to be aligned with the object to be measured.

FIG. 1 also indicates the scan direction A. It is realized in the horizontal direction or perpendicular to the linear alignment of the individual sensors 1. This is further illustrated on the basis of FIG. 2, which additionally shows the object 2 to be measured, which is pivotable about two axes 31, 32, which are perpendicular to one another. A gonioradiometer of type 1.1 according to FIG. 11 is realized in the illustrated exemplary embodiment.

Sensors 1 can in principle be any desired sensors that are suitable for measuring optical radiation in the wavelength range of 100 nm to 1 µm or in a subregion of this wavelength range. They are, for example, photometers. Provision may be made for the sensors 1 to perform partial or full filtering, by way of which the sensitivity of the sensor imitates the sensitivity curve of the standard eye. The sensors 1 output, for example, brightness values as output values.

Figure 2:
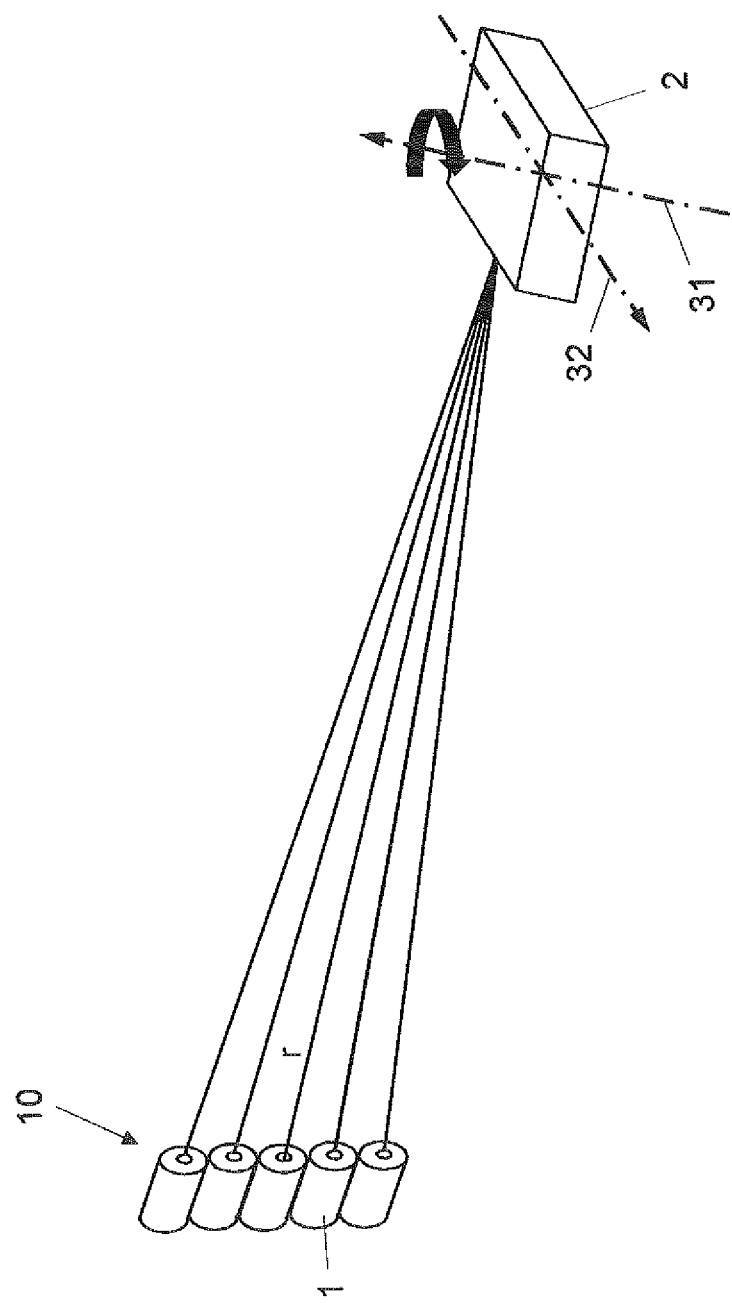
FIG. 2 shows the arrangement of FIG. 1 together with an optical radiation source which is pivotable about two axes.

In the linear arrangement of a multiplicity of sensors illustrated in FIGS. 1 and 2, a multiplicity of latitudes of a coordinate system according to FIG. 10 are measured at the same time in a scanning operation which takes place in the scan direction A, i.e., in the horizontal direction. Provision may be made here for 2 to 10, in particular 3 to 5, individual sensors to be provided in linear arrangement. The sensors 1 are preferably located in the far field of the optical radiation source 2 to be measured, for example at a distance of 25 m, although smaller distances of e.g., 10 m can also be realized, in particular if a lens is additionally inserted into the beam path, as will be explained with reference to FIG. 9.

By using a multiplicity of sensors 1, a solid angle to be captured is captured more quickly with constant quality of the sensor signals, with the result that the measurement time is shortened. For example in the exemplary embodiment of FIGS. 1 and 2, a plurality of latitudes are covered during a scan, such that in one of the subsequent scan operations, the optical radiation source 2 can be tilted by a correspondingly larger angle about the axis 32.

The perpendicular, equidistant arrangement, illustrated in FIGS. 1 and 2, of a plurality of sensors with a fixed angle distance is thus advantageous in the case of horizontal scanning of the light distribution, wherein a plurality of horizontal cross sections of the angle distribution are recorded at the same time. Since 0.05° is a typical angle measurement for the detector coverage in detectors at 25 m distance with a light-receiving surface of a diameter of 30 mm, in one configuration, a distance d of the sensors that is suitable is a multiple of 0.05°, e.g., 0.1°, 0.15°, 0.2° or 0.25°. However, other angle distances are also possible. In other words, two neighboring sensors have, for example, in each case an angle distance d of at least 0.1° if a circle is considered on whose circumference the neighboring sensors are located and in whose center the radiation source 2 is located. With a radius of 25 m, the distance between neighboring sensors is, for example, at least 4 cm, in particular at least 7 cm, in particular between 7 and 15 cm, although larger distances can also be realized. The individual sensors are locally separated.

In all solutions, an exact adjustment of all sensors is important to prevent oscillations in the light image (known as Moiré figures). This can be done, in addition to an initial calibration, during a measurement by operating with a certain overlap of the sensors in order to be able to perform this adjustment. The adjustment can be effected in point operation or scan operation.

Figure 3:
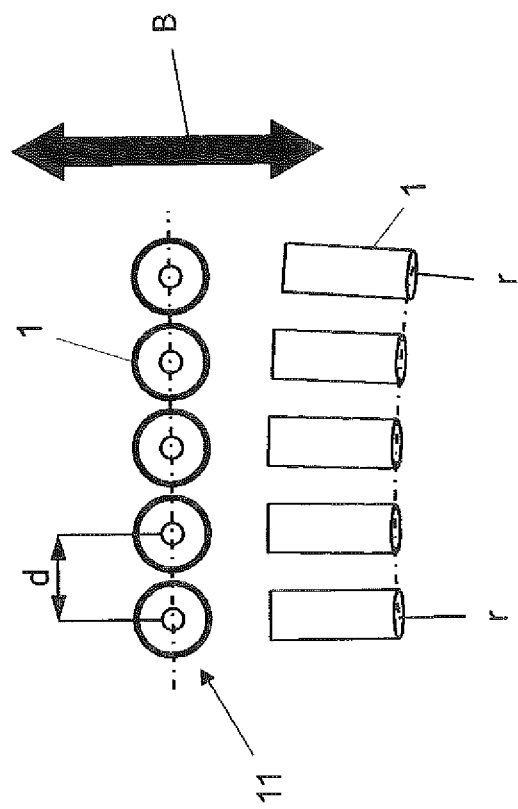
FIG. 3 shows a front and side view of horizontally arranged sensors of a gonioradiometer.
Figure 4:
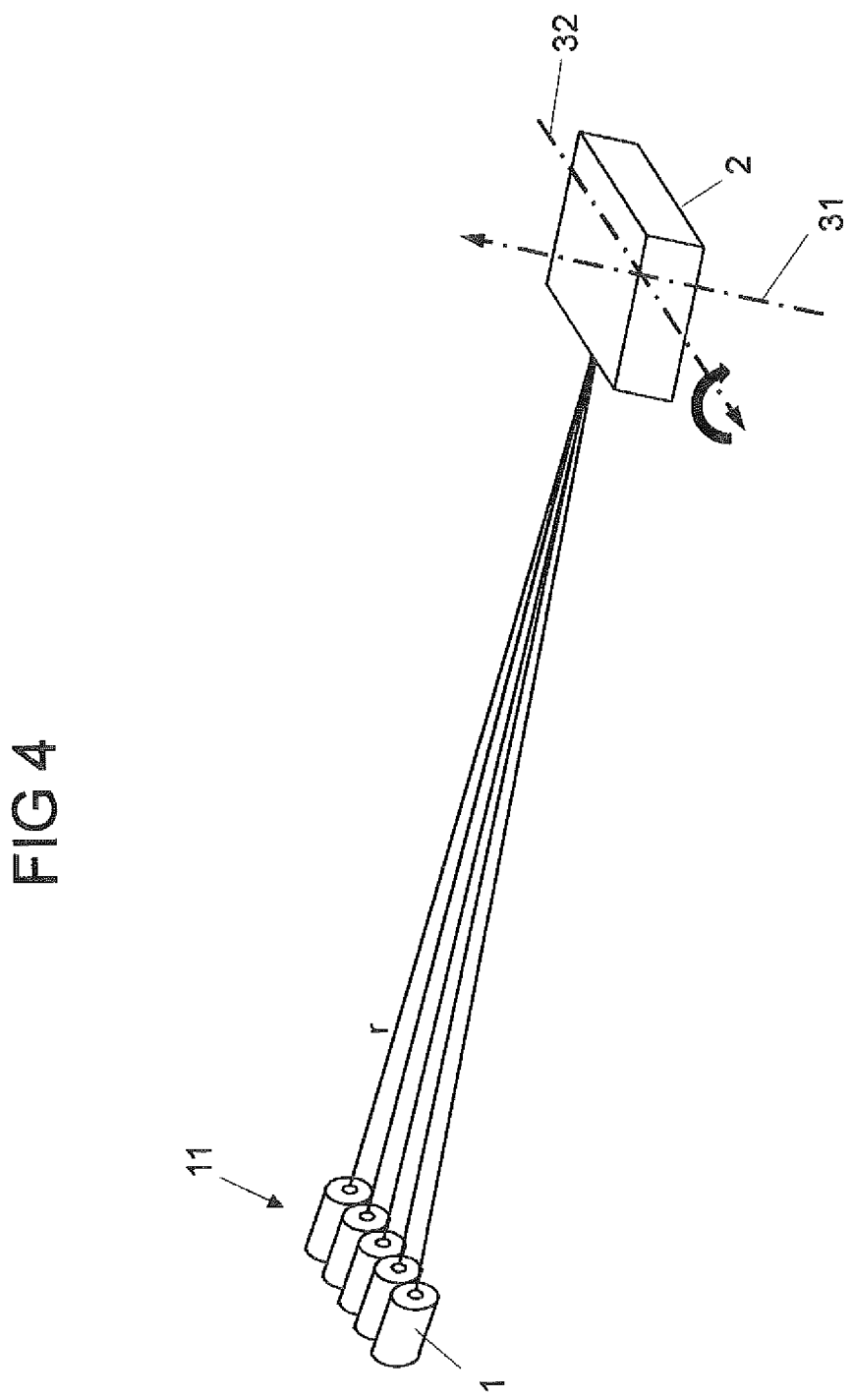
FIG. 4 shows the arrangement of FIG. 3 together with an optical radiation source which is pivotable about two axes.

FIGS. 3 and 4 show an arrangement according to FIGS. 1 and 2, in which a plurality of sensors 1 are arranged horizontally with a fixed distance d, wherein the sensors form a horizontally aligned linear array 11. The scan direction B is realized in the vertical direction or perpendicular to the longitudinal axis of the linear array 11. Once again, the sensors 1 are preferably arranged on a great circle in alignment with the optical radiation source 2 to be measured. As a result, a perpendicular incidence of the light on the light-receiving surface of the sensors 1 is ensured. In addition, the arrangement of the sensors on a great circle with a fixed radius r permits simpler algorithms in the adjustment in the mathematics of the later evaluation.

In the exemplary embodiment of FIGS. 3 and 4, a plurality of longitudes are covered or recorded with each scan about the axis 32.

Figure 5:
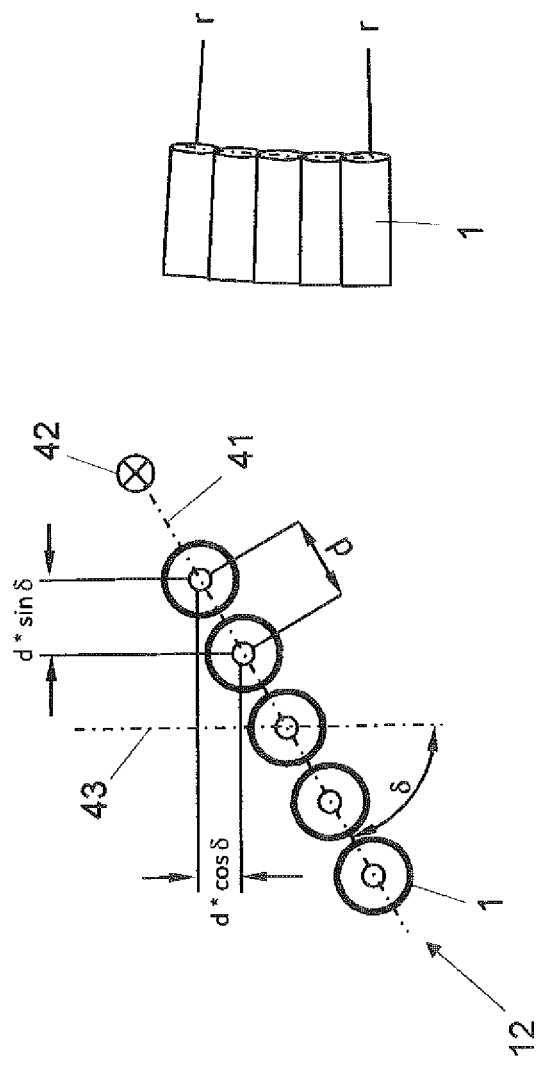
FIG. 5 shows a pivotably mounted, linear sensor array that permits the realization of any desired angle distances.

FIG. 5 shows an exemplary embodiment, in which a plurality of sensors 1 are again arranged in a linear array 12 with a constant distance d between the sensors. The individual sensors 1 or the center points of their light-receiving surfaces (which are preferably configured to be circular in all considered exemplary embodiments) here extend along an axis 41, which in the configuration of FIG. 5 does not extend horizontally or perpendicularly, but at an angle. Provision is furthermore made for the entire arrangement of sensors, that is to say the linear array 12, to be pannable about an axis 42 that extends perpendicular to the axis 41.

The angle by which the entire arrangement is pivotable about a considered optical axis 43 is designated δ in FIG. 5.

In dependence on the pivot angle, during scanning with the array 12 of FIG. 5, a horizontal offset of the individual sensors 1 of d*cos δ occurs, which can be removed again by calculation in the subsequent preparation of data. Analogously therewith, there is a vertical offset for scanning in vertical steps of d*sin δ. The sensor arrangement that is aligned at an angle in FIG. 5 can thus be used both for horizontal scanning and for perpendicular scanning.

A linear equidistant arrangement of a plurality of sensors 1, which are arranged symmetrically with respect to an optical axis and are mounted pivotably about this axis by an arbitrary angle δ as an entire unit, thus enables the setting of arbitrary vertical or horizontal angle distances of the sensors. Here it is once again advantageous if the sensors are arranged on a great circle about the measurement object 2, with the result that perpendicular incidence of the light on the light-receiving surface of the sensors is ensured.

Mention is made of the fact that, in the exemplary embodiment of FIG. 5, the pivot axis 42 about which the linear array 12 is pivotable can alternatively also be configured between the sensors 1 (and thus again perpendicular to the axis 41).

Figure 6:
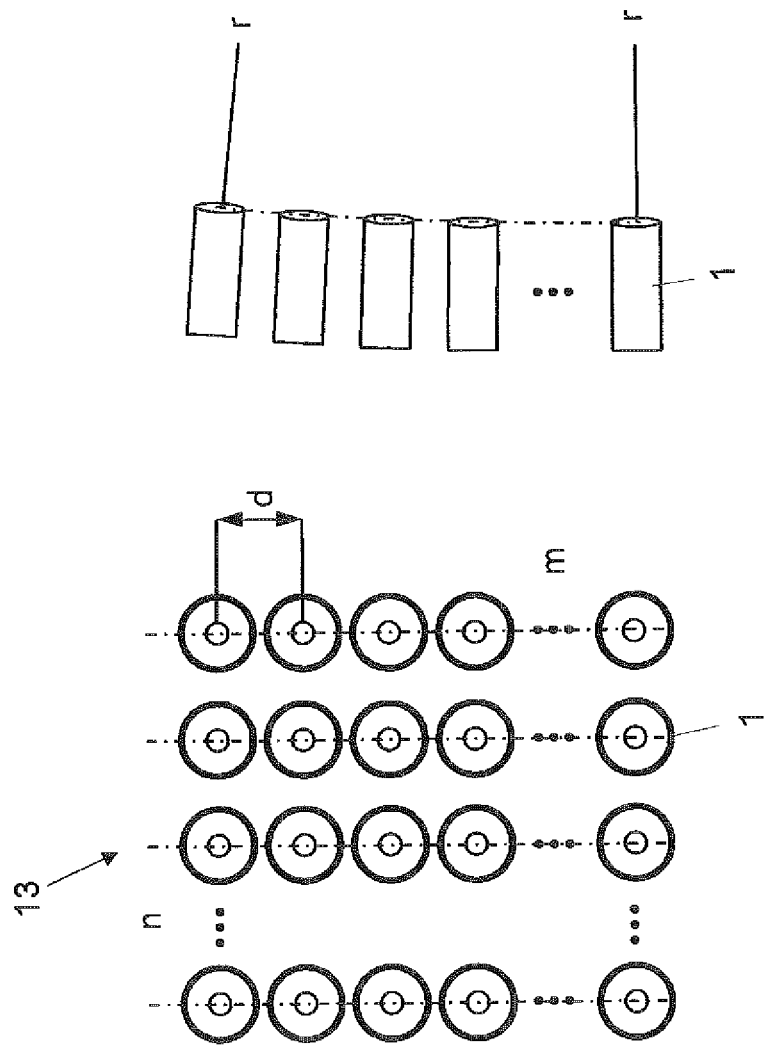
FIG. 6 shows a two-dimensional arrangement of sensors of a gonioradiometer in a matrix for horizontal or perpendicular scans.

FIG. 6 shows an arrangement in which a plurality of sensors 1 are arranged in the form of a matrix or in a two-dimensional grid with n rows and m columns. The distance d between the sensors in a column m is constant here. The distance of the sensors 1 within a row n is preferably also constant. The individual sensors 1 or the light-receiving surfaces thereof can here be arranged on a spherical surface, with the result that the distance r from the object to be measured (located in the origin of the coordinate system) is constant in each case. Accordingly, the solid-angle distances between the sensors 1 within a row and/or within a column are also constant.

Instead of a spherical surface, the sensors 1 can, for the purposes of simplifying the mechanical construction, alternatively also be mounted on any desired other surfaces, such as e.g., a plane, as long as constant solid-angle distances are maintained.

The arrangement of the sensors in a matrix 13 according to FIG. 6 permits the realization of horizontal and/or perpendicular scans, wherein in each scan, a plurality of latitudes and/or longitudes are covered.

The arrangement of the plurality of sensors 1 in a two-dimensional grid 13 can be a collection of individual sensors 1 according to the configuration of FIGS. 1 to 4, wherein a sensor is, for example, a spectral radiometer, a photometer, a photomultiplier, or an infrared, ultraviolet or color measuring head. As already mentioned, the sensors 1 are here preferably photometrically corrected for capturing photometric variables, i.e., weighted with the sensitivity curve of the standard eye.

When using a matrix arrangement of sensors, the gonioradiometer does not necessarily operate in a purely scanning operation, but can switch from the exposure of one solid-angle grid to the next grid. These exposures or the recording of the measurement values can be realized "on-the-fly," i.e., at a constant angular velocity of the gonioradiometer. However, the arrangement in a matrix alternatively offers the possibility of integrating the light incidence at the individual measurement points for sufficiently long to obtain reliable measurement values with a small duty cycle of the radiation source.

FIG. 7 shows an exemplary embodiment of the invention, in which the individual sensors are arranged in the form of a matrix in a camera 7, wherein indirect measurement of a radiation source 2 to be measured is effected via a uniformly reflecting wall 5.

FIG. 7 shows a gonioradiometer which, in addition to a radiation source 2 which is again pivotable about two optical axes 31, 32, has a reflective measuring wall 5 and a camera 7. The measuring wall 5 is configured to be homogeneously reflective, in particular white. A white reflective surface exhibits diffuse, undirected reflection (also referred to as remission). It does not represent a mirror with a directed reflection that meets the law of reflection. A two-dimensional CCD sensor or CMOS sensor 100 arranged in the camera 7 and schematically illustrated (referred to below for both variants as a sensor chip) cooperates with a likewise schematically illustrated optical unit 8, integrated in the camera 7, for example in the form of a lens such that each pixel of the two-dimensional sensor chip 100 is allocated a wall element of the reflective measuring wall 5.

Furthermore, an opening 51 is configured in the measuring wall 5, for example on the optical axis 35 of the radiation source 2 (which for example is a luminaire, a headlight or a light-emitting means), through which opening light emitted from the radiation source 2 passes and is detected by an individual sensor 1'. The sensor 1' is here located on the axis 35 either behind the wall 5 or alternatively in the opening 51. The sensor 1' can also be arranged, however, in any desired direction, as long as it is ensured that it is located in the far field of the light source or luminaire.

The radiation source 2 generates, on the measuring wall 5, a light distribution 6 which, in the illustrated exemplary embodiment, corresponds to the typical light distribution of a car headlight. The light distribution 6 is captured via the sensor chip 100 for each panning movement about the axes 31, 32. Here, the wall 5 is preferably perpendicular to the measurement axis 35 of the gonioradiometer. However, different orientations are also possible, but the distortion of the light distribution that is caused thereby must be correspondingly corrected by way of the evaluation algorithms. The gonioradiometer pivots the measurement object 2 into individual angle positions such that the desired solid angles in the light distribution of the measurement object 2 irradiate the wall 5 and are captured by the sensor chip 100 of the camera by way of the optical unit 8.

The measuring wall 5, which is used for reflection purposes, is here preferably located in the far field of the light distribution of the measurement object 2, i.e., at a distance at which the measurement object 2 can be considered to be approximately a point light source. For focusing headlights, these can be distances of greater than 10 m, while for simple signal lights, distances of 3.16 m ($=\sqrt{10}$) or 5 m are typical.

In the configuration of FIG. 7, a matrix-type arrangement of sensors is thus provided which is realized by way of a sensor chip 100 of a camera 7 in combination with a sufficiently homogeneously reflecting measuring wall 5, wherein the camera 7 views the measuring wall 5 by way of a suitable optical unit. The sensor chip 100 of the camera 7 is here preferably photometrically corrected, although this is not necessarily the case for all measurement tasks.

The dynamic of the measurement in the case of indirect measurement by way of a camera 7 is smaller in comparison with a direct measurement with photometers. This is linked to the fact that the scattered light suppression both in the measurement space and in the objective lens when using a camera 7 is limited. For this reason, a dynamic of more than 100:1 can be achieved only with a very large outlay. With this in mind, provision may be made for outstanding points of the light distribution, e.g., the maxima or minima, in individual zones to be measured later, after ascertainment with the sensor chip 100 of the camera 7, by way of corresponding alignment of the goniometer, with a fixedly attached photometer head with greater dynamic. This makes sense in particular for regions of the light distribution 6 with low illuminance values, because in such cases, the process using a camera 7 reaches its limit owing to the scattered light issue. However, points with high illuminance values can also be exactly measured using a photometer (e.g., a photometer with partial filtering) and subsequently their values can be used for calibrating the camera sensor 100.

The sensor 1', illustrated in FIG. 7, which is formed by way of a customary light sensor with a high dynamic is such a fixedly installed photometer head. The sensor 1' can be used to exactly calibrate the region of the light distribution 6 that, during a measurement, currently falls into the opening 51 and is captured by the sensor chip 100. If appropriate, further openings and associated sensors can be provided in the measuring wall 5. Since calibration can be realized by way of fixedly installed sensors 1', the combination of measuring wall 5 and camera 7 only needs to be used for angle determination of outstanding points of a light distribution. This is associated with advantages in the traceability of the measurement values, because the combination of measuring wall 5 and camera 7 does not need to be calibrated absolutely, but can be calibrated during measurement with the photometer.

It should be noted that the distortion which occurs owing to the angled arrangement of the camera 7 with respect to the measuring wall 5 is removed by calculation during the evaluation.

FIG. 8 shows an arrangement according to FIG. 7 with an optical radiation source 2, measuring wall 5, camera 7, opening 51 and light sensor 1', wherein additionally an imaging lens 9 is arranged in the beam path between the radiation source 2 and the measuring wall 5. The illustration of an individual lens 9, however, is only schematic and to be understood to be an example. In principle, any desired lens system or any desired lenses that focus the beam path emitted by the radiation source 2 or make it more convergent can be used.

In the configuration of FIG. 7, the measuring wall 5 must be arranged in the far field of the radiation source 2 so as to be able to capture the correct light distribution. Even for narrowly emitting luminaires and headlights with an emission angle of +/−20°, a width of the measuring wall at 10 m distance of 7.3 m is obtained here. For greater emission angles, the space required increases drastically. If the far field, as is common for modern motor vehicle matrix headlights, is assumed to be only at 50 m, large halls would be necessary to provide a measuring wall.

The problem of a large requirement of space is addressed by way of the use of a lens 9, referred to below as a "shortening lens." The lens 9 results in the shortening of the measurement distance and the decreasing of the size of the light distribution on the measuring wall. The far field is consequently, e.g., not assumed to be at 50 m, but already at a distance of 10 m. The use of a shortening lens also has the advantage that, since the intensity of the light on the wall 5 increases with the square of the shortening factor, short integration times are possible during the measurement operation.

FIG. 9 illustrates a group of solid-angle regions, in the case of which a plurality of wall parts are combined to form spherical surfaces in a greater solid-angle element using a gonioradiometer according to FIGS. 7 and 8. FIG. 9 shows the radiation source 2 and its optical axis 35, the two mutually perpendicularly arranged axes 31, 32, about which the radiation source 2 is pivotable, the camera 7 and the homogeneously reflecting measuring wall 5, wherein individual wall parts 55, which correspond to individual solid-angle elements or solid-angle regions 56 of a spherical coordinate system with the radiation source 2 in the coordinate origin, are schematically illustrated on the measuring wall.

By arranging the individual solid-angle grids next to one another, the entire light distribution can be combined. To this end, for the purposes of refining the resolution, an interlace method can be provided in which the combining of individual solid angles is realized with an overlap of the individual images (as is known, when creating panorama recordings, by the term "photo-stitching").

In terms of its configuration, the invention is not limited to the exemplary embodiments illustrated above which are to be understood to be merely examples. Reference is also made to the fact that the features of the individual described exemplary embodiments of the invention can be combined in different combinations with one another. Where ranges are defined, these comprise all the values within these ranges and all the subregions that fall into a range.

The invention claimed is:

1. A gonioradiometer for the direction-dependent measurement of at least one lighting or radiometric characteristic variable of an optical radiation source, having:
 a radiation source movable during a measurement operation about a first axis and about a second axis that is perpendicular to the first axis,
 a measuring wall exhibiting homogeneous reflection, on which the light from the radiation source is reflected, and
 a locationally fixed and immovably arranged camera having an optical unit and a two-dimensional sensor chip,
 wherein the camera is arranged such that it captures light reflected on the measuring wall, wherein the reflected light is imaged by the optical unit of the camera onto the sensor chip of the camera,
 and wherein the sensor chip records measurement values as the radiation source is rotated during a measurement operation, which measurement values indicate the lighting or radiometric characteristic variable on a spherical surface about the radiation centroid of the radiation source.

2. The gonioradiometer as claimed in claim 1, characterized in that the measuring wall is located in the far field of the light distribution of the radiation source.

3. The gonioradiometer as claimed in claim 1, characterized in that furthermore an opening in the reflective measuring wall and a sensor are provided which sensor is arranged such that light from the radiation source directly illuminates the sensor through the opening.

4. The gonioradiometer as claimed in claim 3, characterized in that the gonioradiometer comprises means that calibrate the sensor chip, taking into account the signal detected by the sensor.

5. The gonioradiometer as claimed in claim 1, characterized by at least one imaging lens or at least one imaging lens system which focuses the beam path emitted by the radiation source or makes it more convergent and which is arranged between the radiation source and the measuring wall.

6. The gonioradiometer as claimed in claim 1, characterized in that the gonioradiometer is configured to pivot the radiation source during a measurement operation about the first axis and about the second axis that is perpendicular to the first axis, wherein the radiation source is pivoted into individual angle positions such that the desired solid angles in the light distribution of the radiation source irradiate the measuring wall and are captured by the sensor chip of the camera by way of the optical unit.

7. The gonioradiometer as claimed in claim 1, characterized in that the measuring wall exhibits a white, homogeneously reflecting surface.

8. A method for the direction-dependent measurement of at least one lighting or radiometric characteristic variable of an optical radiation source having at least one sensor, wherein the optical radiation source is pivoted during a measurement operation about a first axis and about a second axis that is perpendicular to the first axis, and the at least one sensor is arranged such that it is locationally fixed and immovable, and wherein the radiation source is moved during the measurement such that the at least one sensor records measurement values that indicate the lighting or radiometric characteristic variable at least on a spherical surface about the radiation centroid of the radiation source, characterized in that at least two sensors are provided which provide measurement values at the same time during a measurement.

9. The method as claimed in claim 8, characterized in that the at least two sensors are arranged on a longitude or latitude and are aligned here with the optical radiation source.

10. The method as claimed in claim 8, characterized in that the optical radiation source is pivoted, during a scan, about one of the two axes, while the other axis is fixed during the scan, wherein the at least two sensors are arranged along an axis the direction of which coincides with the direction of the axis about which the optical radiation source is pivoted.

11. The method as claimed claim 8, characterized in that the at least two sensors are arranged vertically one above the other, wherein the optical radiation source is pivoted along a horizontal direction.

12. The method as claimed in claim 8, characterized in that the at least two sensors are arranged horizontally next to one another, wherein the optical radiation source is pivoted along a vertical direction.

13. The method as claimed in claim 8, characterized in that the at least two sensors are arranged at a constant distance from one another linearly on an axis and are pivoted, for different scans, in their linear arrangement as a whole about an axis that is perpendicular to this axis.

14. (Previously Presented The method as claimed in claim 8, characterized in that the at least two sensors are arranged in the form of a two-dimensional array.

15. The method as claimed in claim 8, characterized in that two neighboring sensors have in each case an angle distance of at least 0.1°, if a circle is considered on whose circumference the neighboring sensors are located and in whose center the radiation source is located.

16. The method as claimed in claim 8, characterized in that the light from the radiation source is reflected with homogeneous reflection on a measuring wall and reflected light is captured by a camera, wherein the reflected light is imaged by an optical unit onto a two-dimensional sensor chip, and wherein the at least two sensors are formed by pixels of the sensor chips.

17. The method as claimed in claim 16, characterized in that light from the radiation source additionally directly illuminates a further sensor through an opening in the reflective measuring wall and the signal captured by this sensor is used for a calibration of the sensor chip.

18. The method as claimed in claim 16, characterized in that the radiation source is pivoted into individual angle positions such that desired solid-angle regions of the light distribution irradiate the measuring wall and are captured by the sensor chip by way of the optical unit.

19. The method as claimed in claim 16, characterized in that light distributions of solid-angle regions which are associated with different positions of the goniometer, which light distributions are captured by the sensor chip after reflection on the measuring wall, are combined to form the light distribution which is associated with a greater solid-angle region.

20. The method as claimed in claim 8, characterized in that the light passes between the radiation source and the at least two sensors through at least one imaging lens or at least one imaging lens system.

21. The method as claimed in claim 8, characterized in that
the output emission direction of the lighting or radiometric characteristic variable is described using a plane system, the planes of which intersect in an intersecting line that extends through the radiation centroid of the radiation source and using an emission angle that indicates the emission direction within a considered plane, wherein
each measurement value of the lighting or radiometric characteristic variable is assigned a specific plane of the plane system and a specific emission angle within this plane, and
the at least two sensors provide measurement values simultaneously for one or more planes of the plane system.

* * * * *